United States Patent
Medinei et al.

(10) Patent No.: US 12,072,183 B2
(45) Date of Patent: Aug. 27, 2024

(54) SYSTEM AND METHOD TO INCREASE AVAILABILITY RANGE OF HITCH ARTICULATION ANGLE ESTIMATIONS USING ULTRASONIC SENSORS

(71) Applicant: GM GLOBAL TECHNOLOGY OPERATIONS LLC, Detroit, MI (US)

(72) Inventors: Nojan Medinei, Toronto (CA); Anushya Viraliur Ponnuswami, Oshawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 454 days.

(21) Appl. No.: 17/645,361

(22) Filed: Dec. 21, 2021

(65) Prior Publication Data

US 2023/0194232 A1 Jun. 22, 2023

(51) Int. Cl.
*G01B 21/22* (2006.01)
*B60D 1/06* (2006.01)
*G01B 5/00* (2006.01)
*G01S 11/16* (2006.01)

(52) U.S. Cl.
CPC .......... *G01B 5/0025* (2013.01); *B60D 1/065* (2013.01); *G01B 21/22* (2013.01); *G01S 11/16* (2013.01)

(58) Field of Classification Search
CPC .................................................. G01B 5/0025
USPC .......................................................... 33/288
See application file for complete search history.

(56) References Cited

U.S. PATENT DOCUMENTS

| | | | |
|---|---|---|---|
| 7,142,098 B2* | 11/2006 | Lang .................. | B60D 1/62 340/506 |
| 9,464,953 B2* | 10/2016 | Wirthlin .................. | G01L 5/136 |
| 9,643,462 B2* | 5/2017 | McAllister .............. | B60D 1/248 |
| 9,987,892 B2* | 6/2018 | Ghannam ................ | B60D 1/28 |
| 10,632,803 B2* | 4/2020 | Niewiadomski ........ | B60R 11/04 |
| 11,008,033 B2* | 5/2021 | Bondaryk .............. | B62B 5/0003 |
| 11,180,148 B2* | 11/2021 | Niewiadomski .......... | B60R 1/26 |
| 11,279,187 B2* | 3/2022 | Niewiadomski ......... | B60D 1/26 |
| 11,287,827 B2* | 3/2022 | Berkemeier ............. | G06T 7/248 |
| 11,358,639 B2* | 6/2022 | Raeis Hosseiny . | B62D 15/0275 |
| 11,420,589 B2* | 8/2022 | Brady ...................... | H02S 40/38 |
| 11,598,870 B2* | 3/2023 | Medinei .................. | G01S 15/42 |
| 11,609,563 B2* | 3/2023 | Hosseiny ............... | B62D 13/06 |
| 2007/0180719 A1* | 8/2007 | Donnelly .................. | B60S 9/02 33/366.11 |

(Continued)

*Primary Examiner* — George B Bennett
(74) *Attorney, Agent, or Firm* — Lorenz & Kopf LLP

(57) ABSTRACT

Systems, methods, and apparatus are provided in a vehicle having a Hitch Articulation Angle (HAA) calculation system for estimating an HAA between the vehicle and a towed trailer. The method includes: receiving a plurality of ultrasonic sensor (USS) range measurements for a first USS on the vehicle while the vehicle is towing the trailer in a forward direction; receiving a plurality of HAA values calculated using geometric equations or a kinematic model that correspond to the plurality of USS range measurements; receiving a USS range measurement for the first USS while the vehicle is operating in a reverse direction or experiencing a high HAA but not from a second USS; estimating an HAA value from the USS range measurement by applying the USS curve characteristics for the first USS; and providing the estimated HAA value to a vehicle motion control system for use in controlling vehicle and trailer motion.

20 Claims, 7 Drawing Sheets

(56) References Cited

U.S. PATENT DOCUMENTS

| | | | | |
|---|---|---|---|---|
| 2013/0253814 A1* | 9/2013 | Wirthlin | ................ | B60D 1/62 |
| | | | | 701/1 |
| 2021/0155238 A1* | 5/2021 | Yu | ........................ | B60D 1/62 |
| 2022/0343535 A1* | 10/2022 | Ip | ............................ | G06T 7/73 |

* cited by examiner

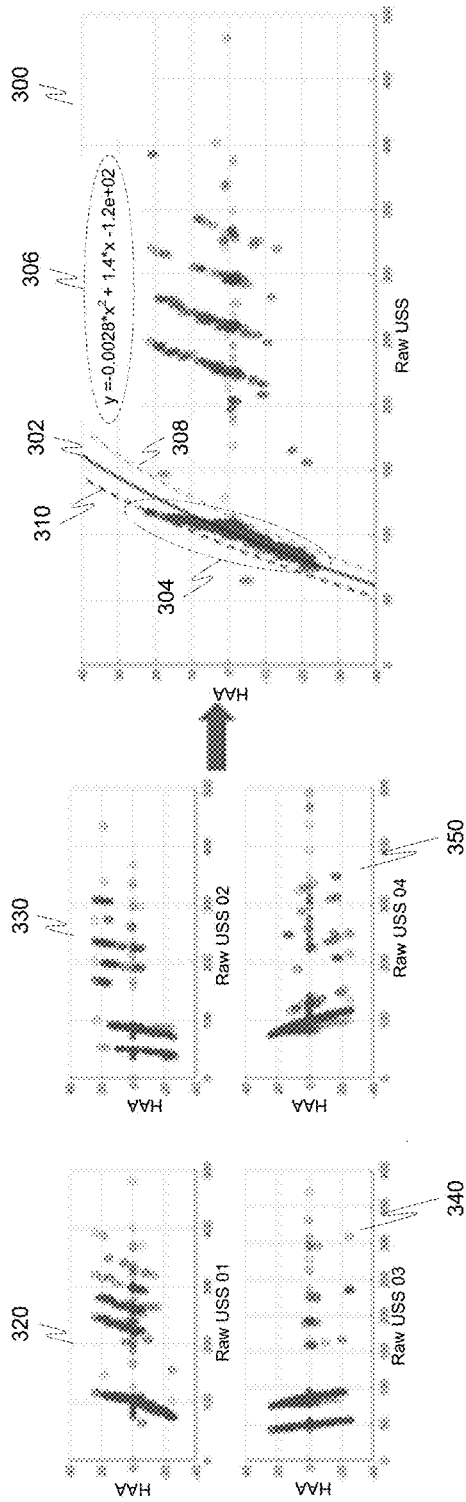
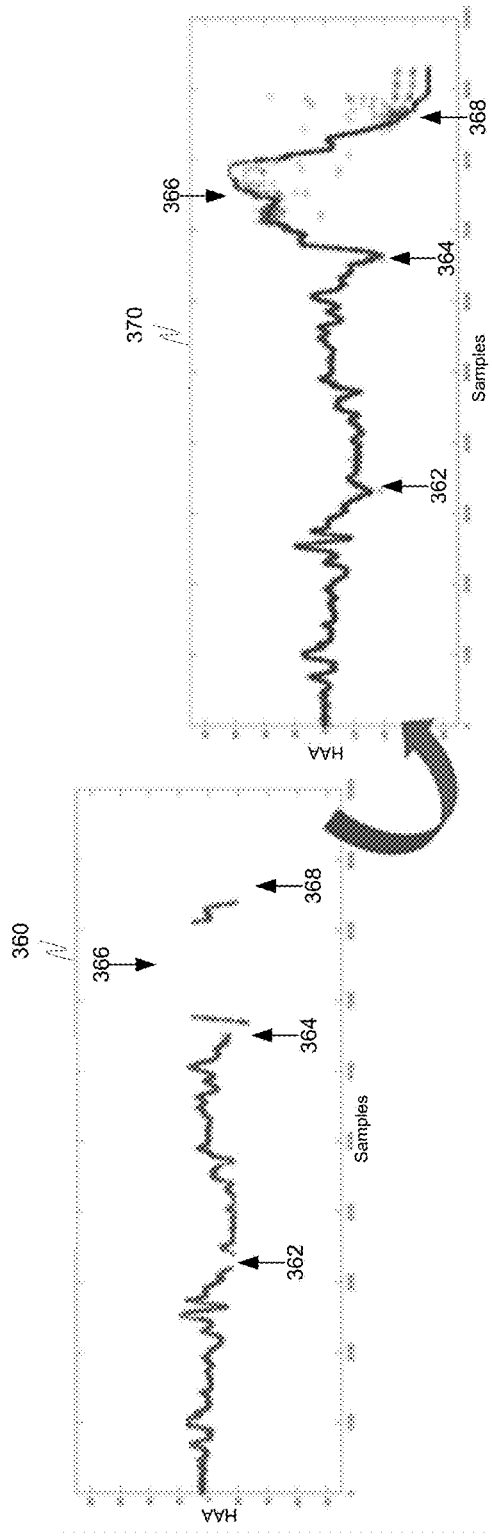
FIG. 3A
FIG. 3B

SYSTEM AND METHOD TO INCREASE AVAILABILITY RANGE OF HITCH ARTICULATION ANGLE ESTIMATIONS USING ULTRASONIC SENSORS

The technical field generally relates to systems, methods, and apparatuses for estimating Hitch Articulation Angle (HAA) and more particularly relates to systems, methods, and apparatuses for estimating Hitch Articulation Angle (HAA) during various trailering dynamic events in towing operations using Ultra-Sonic Sensors (USSs) in a trailering application with a motor vehicle.

Autonomous, semi-autonomous and conventional vehicles can be designed to accommodate the towing or trailering of various loads, of trailers with different front ends that include without limitation: flatbeds, enclosed trailers, cargo hoppers, campers, boats, and sometimes other motorized vehicles. Also, a multitude of different trailer hitches is used in the trailering operations such as gooseneck hitches, weight distribution hitches, pintle hitches, receiver hitches, and $5^{th}$ wheel hitches. Each configuration of trailer type and hitch type displays different vehicle dynamics. There are available, though limited, systems and devices to enhance both vehicle and trailer stability while performing a towing operation, however, given the multitude of combinations of trailers and hitches, there is no so-called one fit for all solution or even for that matter a solution that encompasses most or nearly all of the potential combinations of vehicle, trailers, and hitches that are in connected operation. Moreover, in an attempt to improve stability in this multitude of connected combinations, manufacturers have promoted rudimentary add-ons such as vehicle trim pieces, wind deflectors such as ground effects, which confer the vehicles with additional aerodynamic stability. Also, systems for traction control have been developed, as well as automatically-adjusting suspension systems that alter the height of the body of a vehicle in proportion to the weight of a load. Vehicles towing systems may still be improved in a number of respects.

Ultra-Sonic Sensors (USSs) have traditionally been used for Parking Assist features on vehicles. An Array of Ultra-Sonic Sensors (USSs) can be used for estimation of Hitch Articulation Angle (HAA) when towing trailers. However, the implementation of USSs has been limited in part because of practice obstacles such as high levels of interferences in signal reception noise, undesired reflections other than those from the trailer front such as reflections of the hitch point, and uncertain trailer shapes.

It is therefore desirable for improved methods, systems, and apparatuses that implement USSs to estimate a Hitch Articulation Angle (HAA). Furthermore, other desirable features and characteristics of the present disclosure will become apparent from the subsequent detailed description and the appended claims, taken in conjunction with the accompanying drawings and the foregoing technical field and background.

The information disclosed in this introduction is only for enhancement of understanding of the background of the present disclosure and therefore it may contain information that does not form the prior art that is already known in this country to a person of ordinary skill in the art.

SUMMARY

Disclosed herein are vehicle methods and systems and related control logic for vehicle systems, methods for making and methods for operating such systems, and motor vehicles equipped with onboard control systems. By way of example, and not limitation, there are presented various embodiments that perform automatic determination of a trailer hitch articulation angle for trailering in a motor vehicle, and a method for performing automatic determination of a trailer hitch articulation angle for trailering in a motor vehicle.

In one embodiment, a Hitch Articulation Angle (HAA) calculation system is provided in a vehicle for estimating an HAA between the vehicle and a towed trailer. The HAA calculation system includes a controller. The controller is configured to: receive a plurality of ultrasonic sensor (US S) range measurements for a first USS on the vehicle while the vehicle is towing the trailer in a forward direction, wherein a USS range measurement for a specific USS provides a measurement of a distance between the specific USS and a face of the towed trailer at a specific instance; receive a plurality of HAA values calculated using geometric equations or a kinematic model that correspond to the plurality of US S range measurements, wherein each HAA value corresponds to one of the plurality of USS range measurements and each USS range measurement has a corresponding HAA value; and determine USS curve characteristics for the first USS. The USS curve characteristics include: a curve-fitting function (e.g., polynomial) that is mapped to a likely valid cluster of the plurality of USS range measurements for the first USS and defines a mathematical relationship between USS range measurements in the valid cluster of USS range measurements and corresponding HAA values; an upward-bounding function that is mapped to an upward boundary for USS range measurements in the valid cluster; and a lower-bounding function that is mapped to a lower boundary for USS range measurements in the valid cluster. The controller is further configured to receive a USS range measurement for the first USS while the vehicle is operating in a reverse direction or experiencing a high HAA but not from a second USS whose USS range measurements are used in a pair with the USS range measurements for the first USS to calculate an HAA using geometric equations or a kinematic model; estimate an HAA value from the USS range measurement from the first USS by applying the USS curve characteristics for the first USS; and provide the estimated HAA value to a vehicle motion control system (e.g., Trailer Reverse Assist) for use in controlling vehicle and trailer motion.

In some embodiments, a high HAA is an angle at which accurate USS returns are not available from both USSs in any pair of USSs on the vehicle that are used for calculating an HAA using geometric equations or a kinematic model, but an angle wherein accurate USS returns from one USS in a pair of USSs is available.

In one embodiment, to determine USS curve characteristics for a first USS, the controller is configured to: pair USS range measurements for the first USS with a corresponding HAA value to form USS range measurement/HAA value (USS-HAA) pairs; perform clustering analysis on the USS-HAA pairs; identify the likely valid cluster of the plurality of USS range measurements based on the clustering analysis; and determine the curve-fitting function, upward-bounding function, and lower-bounding function from the likely valid cluster of the plurality of USS range measurements.

In one embodiment, to estimate an HAA value from the USS range measurement from the first USS by applying the USS curve characteristics for the first USS, the controller is configured to filter out USS range measurements for the first USS using the upward-bounding function and lower-bounding function.

In one embodiment, to estimate an HAA value from the USS range measurement from the first USS by applying the USS curve characteristics for the first USS, the controller is further configured to match the USS range measurement from the first USS with an estimated HAA based on applying the mathematical relationship between USS range measurements in the valid cluster of USS range measurements and corresponding HAA values defined by the curve-fitting function.

In one embodiment, the controller is further configured to: receive a plurality of USS range measurements for each of a plurality of USSs on the vehicle while the vehicle is towing the trailer in a forward direction; and determine USS curve characteristics for each of the plurality of USSs within a range of received USS range measurements. The USS curve characteristics are expanded beyond the range within which the USS curve characteristics were initially constructed to provide an expected range of acceptable USS-HAA pairs that extends beyond the range of the received USS range measurements.

In one embodiment, the controller is further configured to: receive a USS range measurement for any one of the plurality of USSs while the vehicle is operating in a reverse direction or experiencing a high HAA but not from a second USS whose USS range measurements are used in a pair with the USS range measurements for the one of the plurality of USSs to calculate an HAA using geometric equations or a kinematic model; and estimate an HAA value from the USS range measurement from the one of the plurality of USSs by applying the USS curve characteristics for the one of the plurality of USSs.

In one embodiment, when the vehicle is experiencing a high HAA, the controller is configured to: estimate an HAA value using appropriate USS curve characteristics; determine whether an HAA value calculated using geometric equations or a kinematic model is available; select the HAA value calculated using geometric equations or a kinematic model when available to pass to vehicle motion controls; and select the estimated HAA value to pass to vehicle motion controls when an HAA value calculated using geometric equations or a kinematic model is not available.

In another embodiment, a vehicle having a Hitch Articulation Angle (HAA) calculation system for estimating an HAA between the vehicle and a towed trailer is provided. The vehicle includes a plurality of ultrasonic sensors (USSs) mounted on the vehicle to sense a distance between a sensor and a face of the towed trailer; a vehicle motion control system for controlling vehicle and trailer motion; and a controller. The controller is configured to: receive a plurality of ultrasonic sensor (USS) range measurements for a first USS of the plurality of USSs while the vehicle is towing the trailer in a forward direction, wherein a USS range measurement for a specific USS provides a measurement of a distance between the specific USS and a face of the towed trailer at a specific instance; receive a plurality of HAA values calculated using geometric equations or a kinematic model that correspond to the plurality of USS range measurements, wherein each HAA value corresponds to one of the plurality of USS range measurements and each USS range measurement has a corresponding HAA value; and determine USS curve characteristics for the first USS. The USS curve characteristics include: a curve-fitting function (e.g., polynomial) that is mapped to a likely valid cluster of the plurality of USS range measurements for the first USS and defines a mathematical relationship between USS range measurements in the valid cluster of USS range measurements and corresponding HAA values; an upward-bounding function that is mapped to an upward boundary for USS range measurements in the valid cluster; and a lower-bounding function that is mapped to a lower boundary for USS range measurements in the valid cluster. The controller is further configured to receive a USS range measurement for the first USS while the vehicle is operating in a reverse direction or experiencing a high HAA but not from a second USS whose USS range measurements are used in a pair with the USS range measurements for the first USS to calculate an HAA using geometric equations or a kinematic model; estimate an HAA value from the USS range measurement from the first USS by applying the USS curve characteristics for the first USS; and provide the estimated HAA value to the vehicle motion control system (e.g., Trailer Reverse Assist) for use in controlling vehicle and trailer motion.

In some embodiments, a high HAA is an angle at which accurate USS returns are not available from both USSs in any pair of USSs on the vehicle that are used for calculating an HAA using geometric equations or a kinematic model, but an angle wherein accurate USS returns from one USS in a pair of USSs is available.

In one embodiment, to determine USS curve characteristics for a first USS, the controller is configured to: pair USS range measurements for the first USS with a corresponding HAA value to form USS range measurement/HAA value (USS-HAA) pairs; perform clustering analysis on the USS-HAA pairs; identify the likely valid cluster of the plurality of USS range measurements based on the clustering analysis; and determine the curve-fitting function, upward-bounding function, and lower-bounding function from the likely valid cluster of the plurality of USS range measurements.

In one embodiment, to estimate an HAA value from the USS range measurement from the first USS by applying the USS curve characteristics for the first USS, the controller is configured to filter out USS range measurements for the first USS using the upward-bounding function and lower-bounding function.

In one embodiment, to estimate an HAA value from the USS range measurement from the first USS by applying the USS curve characteristics for the first USS, the controller is further configured to match the USS range measurement from the first USS with an estimated HAA based on applying the mathematical relationship between USS range measurements in the valid cluster of USS range measurements and corresponding HAA values defined by the curve-fitting function.

In one embodiment, the controller is configured to: receive a plurality of USS range measurements for each of a plurality of USSs on the vehicle while the vehicle is towing the trailer in a forward direction; and determine USS curve characteristics for each of the plurality of USSs within a range of received USS range measurements. The USS curve characteristics are expanded beyond the range within which the USS curve characteristics were initially constructed to provide an expected range of acceptable USS-HAA pairs that extends beyond the range of the received USS range measurements.

In one embodiment, the controller is configured to: receive a USS range measurement for any one of the plurality of USSs while the vehicle is operating in a reverse direction or experiencing a high HAA but not from a second USS whose USS range measurements are used in a pair with the USS range measurements for the one of the plurality of USSs to calculate an HAA using geometric equations or a kinematic model; and estimate an HAA value from the US S range measurement from the one of the plurality of USSs by applying the USS curve characteristics for the one of the plurality of USSs.

In one embodiment, when the vehicle is experiencing a high HAA, the controller is configured to: estimate an HAA value using appropriate USS curve characteristics; determine whether an HAA value calculated using geometric equations or a kinematic model is available; select the HAA value calculated using geometric equations or a kinematic model when available to pass to vehicle motion controls; and select the estimated HAA value to pass to vehicle motion controls when an HAA value calculated using geometric equations or a kinematic model is not available.

In another embodiment, a method in a vehicle having a Hitch Articulation Angle (HAA) calculation system for estimating an HAA between the vehicle and a towed trailer is provided. The method includes: receiving a plurality of ultrasonic sensor (USS) range measurements for a first USS on the vehicle while the vehicle is towing the trailer in a forward direction, wherein a USS range measurement for a specific USS provides a measurement of a distance between the specific USS and a face of the towed trailer at a specific instance; receiving a plurality of HAA values calculated using geometric equations or a kinematic model that correspond to the plurality of USS range measurements, wherein each HAA value corresponds to one of the plurality of US S range measurements and each USS range measurement has a corresponding HAA value; and determining USS curve characteristics for the first USS. The USS curve characteristics include: a curve-fitting function (e.g., polynomial) that is mapped to a likely valid cluster of the plurality of USS range measurements for the first USS and defines a mathematical relationship between USS range measurements in the valid cluster of USS range measurements and corresponding HAA values; an upward-bounding function that is mapped to an upward boundary for USS range measurements in the valid cluster; and a lower-bounding function that is mapped to a lower boundary for USS range measurements in the valid cluster. The mathematical relationship representing these functions are expanded beyond the range within which the USS curve characteristics were initially constructed to provide an expected range of acceptable USS-HAA pairs that extends beyond the range of the received USS range measurements. The method further includes receiving a USS range measurement for the first USS while the vehicle is operating in a reverse direction or experiencing a high HAA but not from a second USS whose USS range measurements are used in a pair with the USS range measurements for the first USS to calculate an HAA using geometric equations or a kinematic model; estimating an HAA value from the USS range measurement from the first USS by applying the USS curve characteristics for the first USS; and providing the estimated HAA value to a vehicle motion control system (e.g., Trailer Reverse Assist) for use in controlling vehicle and trailer motion.

In some embodiments, a high HAA is an angle at which accurate USS returns are not available from both USSs in any pair of USSs on the vehicle that are used for calculating an HAA using geometric equations or a kinematic model, but an angle wherein accurate USS returns from one USS in a pair of USSs is available.

In one embodiment, determining USS curve characteristics for a first USS includes: pairing USS range measurements for the first USS with a corresponding HAA value to form USS range measurement/HAA value (USS-HAA) pairs; performing clustering analysis on the USS-HAA pairs; identifying the likely valid cluster of the plurality of USS range measurements based on the clustering analysis; and determining the curve-fitting function, upward-bounding function, and lower-bounding function from the likely valid cluster of the plurality of USS range measurements.

In one embodiment, estimating an HAA value from the USS range measurement from the first USS by applying the USS curve characteristics for the first USS, includes: filtering out USS range measurements for the first USS using the upward-bounding function and lower-bounding function; and matching the USS range measurement from the first USS with an estimated HAA based on applying the mathematical relationship between USS range measurements in the valid cluster of USS range measurements and corresponding HAA values defined by the curve-fitting function.

In one embodiment, the method further includes: receiving a plurality of USS range measurements for each of a plurality of USSs on the vehicle while the vehicle is towing the trailer in a forward direction; and determining USS curve characteristics for each of the plurality of USSs within a range of received USS range measurements. The USS curve characteristics are expanded beyond the range within which the USS curve characteristics were initially constructed to provide an expected range of acceptable USS-HAA pairs that extends beyond the range of the received USS range measurements.

In one embodiment, the method further includes receiving a USS range measurement for any one of the plurality of USSs while the vehicle is operating in a reverse direction or experiencing a high HAA but not from a second USS whose USS range measurements are used in a pair with the USS range measurements for the one of the plurality of USSs to calculate an HAA using geometric equations or a kinematic model.

In one embodiment, when the vehicle is experiencing a high HAA, the method further includes: estimating an HAA value using appropriate USS curve characteristics; determining whether an HAA value calculated using geometric equations or a kinematic model is available; selecting the HAA value calculated using geometric equations or a kinematic model when available to pass to vehicle motion controls; and selecting the estimated HAA value to pass to vehicle motion controls when an HAA value calculated using geometric equations or a kinematic model is not available.

In another embodiment, a non-transitory computer readable media encoded with programming instructions configurable to cause a controller in a vehicle having a Hitch Articulation Angle (HAA) calculation system for estimating an HAA between the vehicle and a towed trailer to perform a method. The method includes: receiving a plurality of ultrasonic sensor (USS) range measurements for a first USS on the vehicle while the vehicle is towing the trailer in a forward direction, wherein a USS range measurement for a specific USS provides a measurement of a distance between the specific USS and a face of the towed trailer at a specific instance; receiving a plurality of HAA values calculated using geometric equations or a kinematic model that correspond to the plurality of USS range measurements, wherein each HAA value corresponds to one of the plurality of US S range measurements and each USS range measurement has a corresponding HAA value; and determining USS curve characteristics for the first USS. The USS curve characteristics include: a curve-fitting function (e.g., polynomial) that is mapped to a likely valid cluster of the plurality of USS range measurements for the first USS and defines a mathematical relationship between USS range measurements in the valid cluster of USS range measurements and corresponding HAA values; an upward-bounding function that is mapped to an upward boundary for USS range measurements in the valid cluster; and a lower-bounding function that is mapped to a lower boundary for USS range measurements in the valid cluster. The method further includes receiving a USS range measurement for the first USS while the vehicle is operating in a reverse direction or experiencing a high HAA but not from a second USS whose USS range measurements are used in a pair with the USS range measurements for the first USS to calculate an HAA using geometric equations or a kinematic model; estimating an HAA value from the USS range measurement from the first USS by applying the USS curve characteristics for the first USS; and providing the estimated HAA value to a vehicle motion control system for use in controlling vehicle and trailer motion.

BRIEF DESCRIPTION OF THE DRAWINGS

The exemplary embodiments will hereinafter be described in conjunction with the following drawing figures, wherein like numerals denote like elements, and wherein:

FIG. 3A is a diagram depicting a series of graphs that show HAA values determined using geometric equations or a kinematic model plotted versus raw USS distances measurements from a USS, in accordance with an embodiment;

FIG. 3B is a diagram depicting a pair of graphs that show HAA values plotted versus time for a vehicle with a trailer, in accordance with an embodiment;

DETAILED DESCRIPTION

Figure 1:
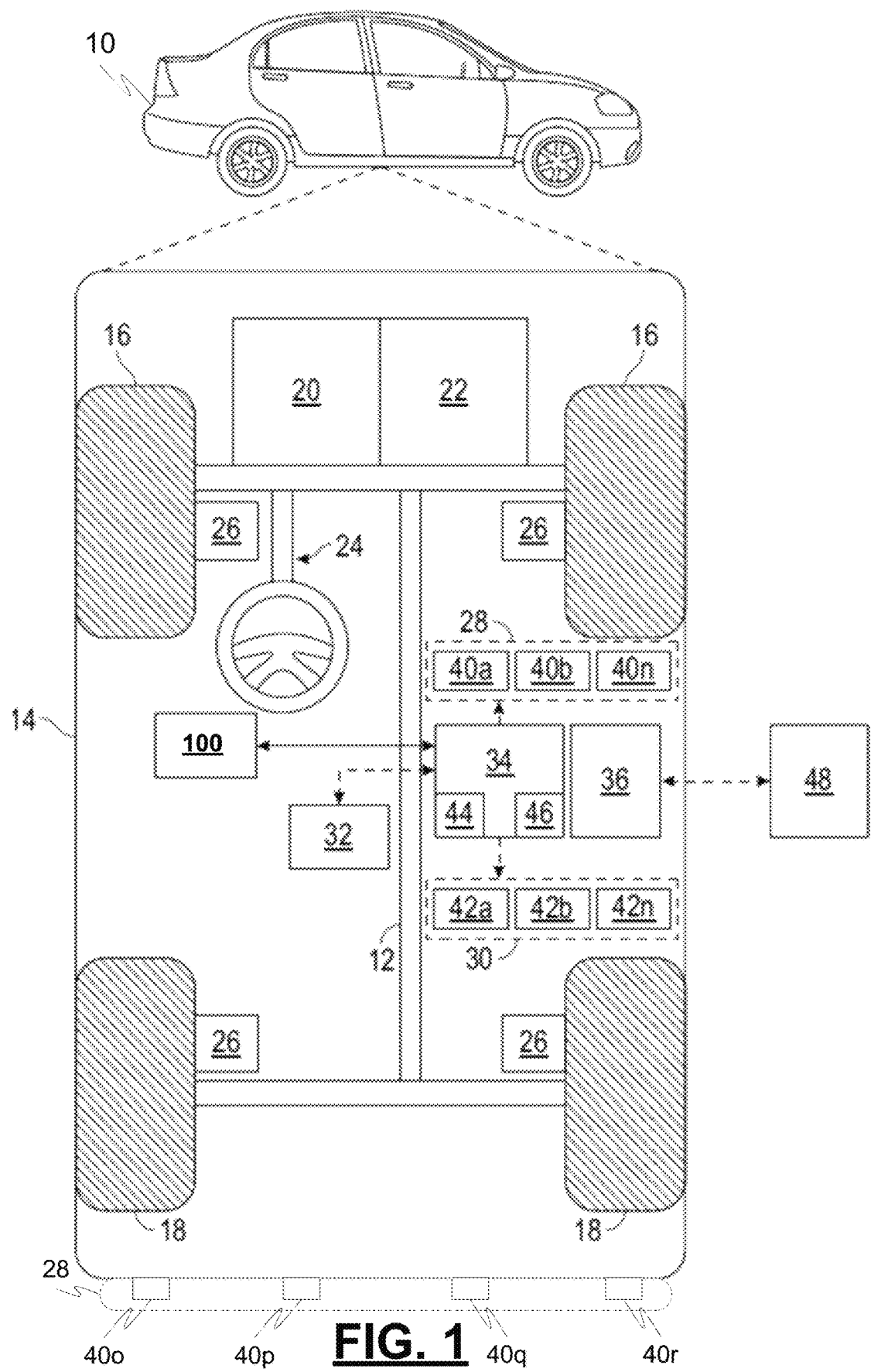
FIG. 1 is a block diagram depicting an example vehicle that includes a Hitch Articulation Angle (HAA) calculation system that uses Ultrasonic Sensor (USS) reflections to calculate an HAA, in accordance with an embodiment.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Autonomous and semi-autonomous vehicles are capable of sensing their environment and navigating based on the sensed environment. Such vehicles sense their environment using multiple types of sensing devices such as optical cameras, radar, lidar, other image sensors, and the like. In such vehicles, the sensed data can be fused together with map data and vehicle sensors (inertial measurement unit, vehicle speed sensors, etc.) to identify and track vehicle trajectory tracking performance based on road geometry, as well as applicable in this disclosure for sensing data for kinematic modeling and for estimating Hitch Articulation Angle (HAA) for enhancing towing stability when towing a trailer.

Current methods for using Ultrasonic Sensor (US S) reflections to calculate Hitch Articulation Angle (HAA) require the availability of at least two sensors for comparison reasons. Often calculation of HAA angles using USS reflections is not available for higher trailer hitch angles due to lack of sensor reflections. The disclosed subject includes methods that allow for the use of USS reflections to calculate HAA angles even when the reflections from only one sensor is available. This can expand the range of HAA that can be calculated using only raw USS range measurements. The methodology can greatly help because of the lack of kinematic model availability in a reverse driving mode.

Also, due to noisiness of USS reflections, estimations of HAA can also be inaccurate for higher angles using other methods. The disclosed subject includes methods that allow for better estimation of HAA in higher angles even with a single sensor reflection.

FIG. 1 is a block diagram depicting an example vehicle 10 that includes a Hitch Articulation Angle (HAA) calculation system 100 that uses Ultrasonic Sensor (USS) reflections to calculate an HAA. In many operating scenarios at least two sensors are available for use in calculating the HAA. However, in higher trailer hitch angle scenarios only one sensor may be available due to a lack of sensor reflections. The disclosed HAA calculation system 100 may estimate the HAA in many higher trailer hitch angle scenarios using raw USS range measurements, even when only one sensor is available. This can be particularly helpful in scenarios having a lack of kinematic model availability, for example, when a towing vehicle and trailer are operating in a reverse driving mode.

As depicted in FIG. 1, the example vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 is depicted in the illustrated embodiment as a passenger car, but other vehicle types, including trucks, sport utility vehicles (SUVs), recreational vehicles (RVs), etc., may also be used. The vehicle 10 may be capable of being driven manually, autonomously and/or semi-autonomously.

The vehicle 10 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48.

The sensor system 28 includes one or more sensing devices 40a-40r that sense observable conditions of the exterior environment and/or the interior environment of the autonomous vehicle 10. The sensing devices 40a-40r can include but are not limited to, radars, lidars, global positioning systems, optical cameras, thermal cameras, ultrasonic sensors (e.g., 40o-40r), inertial measurement units, Ultra-Wideband sensors, and/or other sensors. The actuator system 30 includes one or more actuator devices 42a-42n that control one or more vehicle features such as, but not limited to, the propulsion system 20, the transmission system 22, the steering system 24, and the brake system 26.

The data storage device 32 stores data for use in automatically controlling the vehicle 10. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. The one or more instructions of the controller 34, when executed by the processor 44, may configure the vehicle 10 to estimate an HAA between the vehicle and a towed trailer using a single USS range measurement and USS curve characteristics for the USS providing the USS range measurement.

The HAA calculation system 100 may include any number of additional sub-modules embedded within the controller 34, which may be combined and/or further partitioned to similarly implement systems and methods described herein. Additionally, inputs to the HAA calculation system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
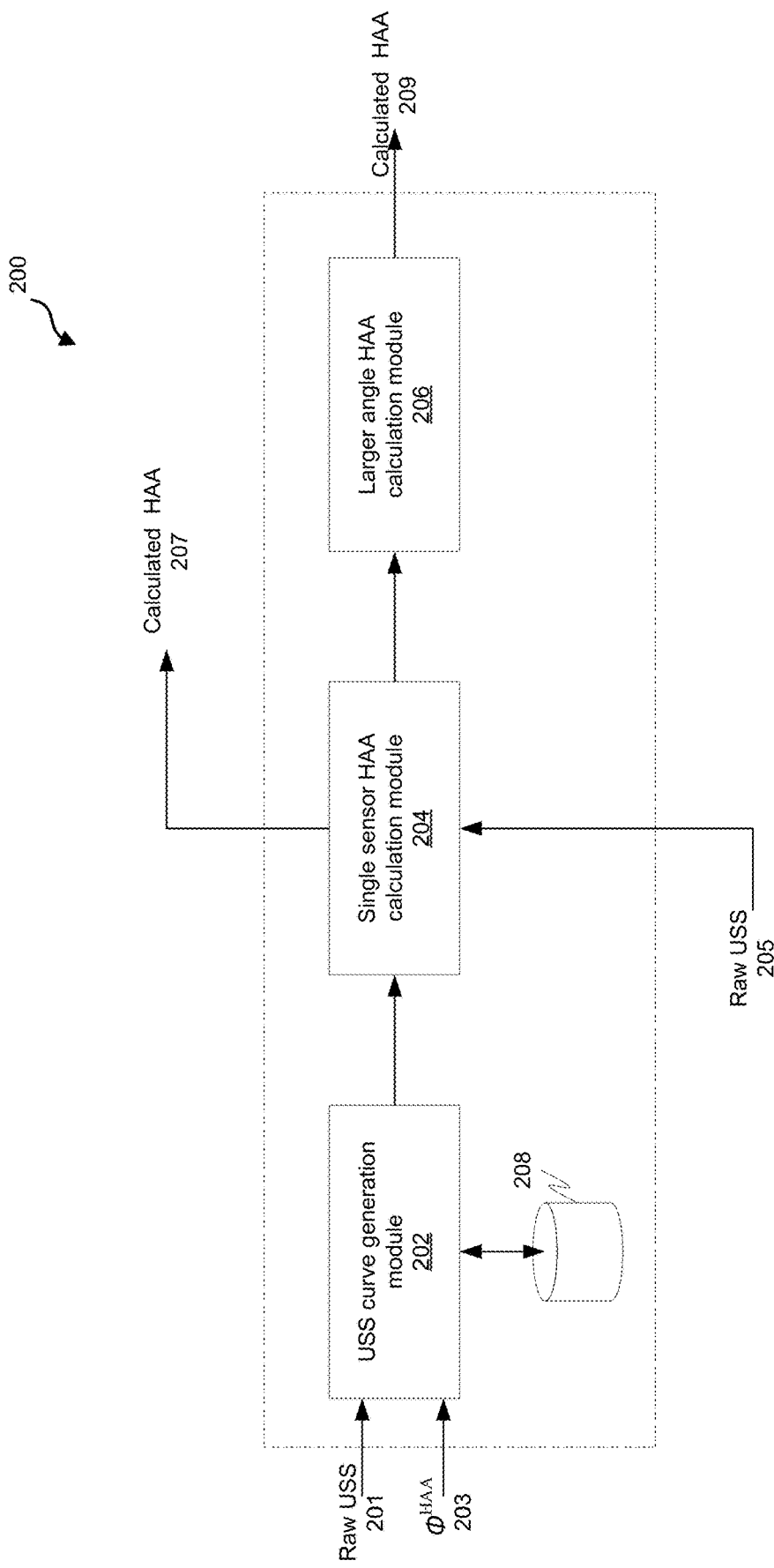
FIG. 2 is a block diagram depicting an example HAA calculation system that is configured to estimate an HAA between the vehicle and a towed trailer using a single USS range measurement and USS curve characteristics for the USS providing the USS range measurement, in accordance with an embodiment.

FIG. 2 is a block diagram depicting an example HAA calculation system 200 that is configured to estimate an HAA between the vehicle and a towed trailer using a single USS range measurement and USS curve characteristics for the USS providing the USS range measurement. The example HAA calculation system takes in Raw USS measurements 201, along with corresponding HAA values 203, calculated by geometric equations or kinematic model, as inputs. The example HAA calculation system 200 includes a USS curve generation module 202, a single sensor HAA calculation module 204, and a larger angle HAA calculation module 206. The example HAA calculation system 200, USS curve generation module 202, single sensor HAA calculation module 204, and larger angle HAA calculation module 206 may be implemented by controller 34.

FIG. 3A is a diagram depicting a series of graphs 300, 320, 330, 340, and 350 that show HAA values determined using geometric equations or a kinematic model plotted versus raw USS distances measurements from a USS. Graph 320 provides a plotting of HAA values versus raw USS distances measurements from a first USS on a vehicle. Graph 330 provides a plotting of HAA values versus raw USS distances measurements from a second USS on a vehicle. Graph 340 provides a plotting of HAA values versus raw USS distances measurements from a third USS on a vehicle. Graph 350 provides a plotting of HAA values versus raw USS distances measurements from a fourth USS on a vehicle. Graph 300 shows one example of graphs 320, 330, 340, and 350 after performance of clustering and curve fitting operations. Depicted in graph 300 is curve-fitting function 302 (e.g., a curve-fitting polynomial) that is mapped to a likely valid cluster 304 of the plurality of USS range measurements for a specific USS and defines a mathematical relationship (e.g., mathematical relationship 306) between USS range measurements in the likely valid cluster 304 of USS range measurements and corresponding HAA values. Also depicted are an upward-bounding function (e.g., upward-bounding curve 308) that is mapped to an upward boundary for USS range measurements in the likely valid cluster 304 and a lower-bounding function (e.g., lower-bounding curve 310) that is mapped to a lower boundary for USS range measurements in the likely valid cluster 304.

FIG. 3B is a diagram depicting a pair of graphs 360 and 370 that show HAA values plotted versus time for a vehicle with a trailer. Graph 360 depicts HAA values determined for the vehicle using USS range measurements for a pair of USSs and either geometric equations or a kinematic model. Graph 370 depicts HAA values determined for the vehicle using USS range measurements for a pair of USSs and either geometric equations or a kinematic model plus estimated HAA values estimated using techniques described herein merged with HAA values calculated using geometric equations or a kinematic model.

Figure 4:
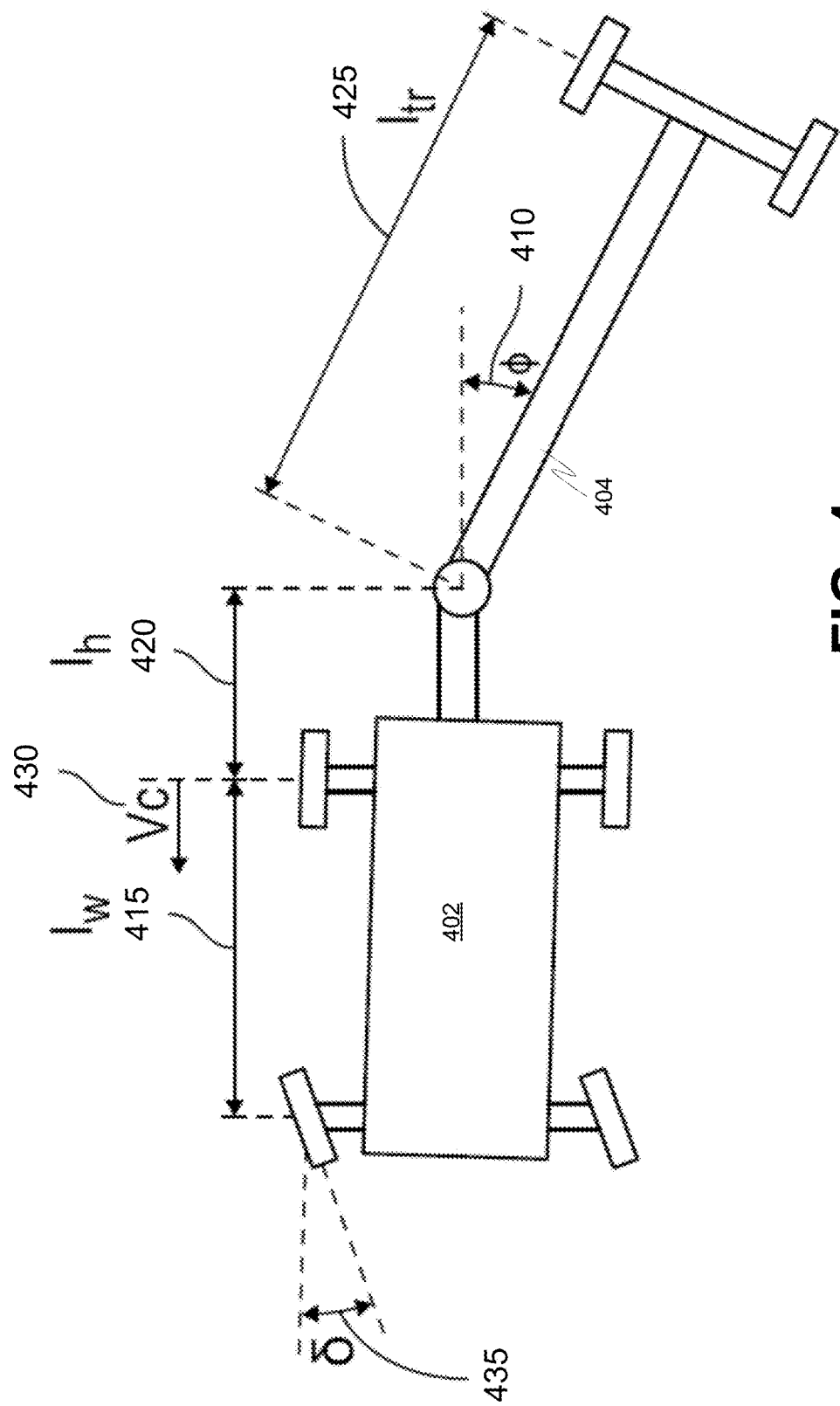
FIG. 4 is a block diagram depicting an example vehicle and trailer, in accordance with an embodiment.

FIG. 4 is a block diagram depicting an example vehicle 402 and trailer 404. Depicted is an HAA 410 "ϕ" between the vehicle 402 and trailer 404 that can be calculated according to geometric equations. In this example, HAA 410 "ϕ" is calculated based on a set of measurements of the distance $l_w$ 415 of the vehicle's wheelbase, the distance $l_h$ 420 between the vehicle's rear axle and hitch point, the distance $l_{tr}$ 425 between the hitch point and the trailer's rear axle, and the angle δ 435 of the vehicle's road wheel angle. The example geometric equation to calculate HAA 410 "ϕ" is as follows:

$$\dot{\phi} = -\frac{V_c}{l_{tr}} \sin\phi - \frac{V_c}{l_w} \tan\delta \left(\frac{l_h}{l_{tr}} \cos\phi + 1\right),$$

where $V_c$ 430 is the vehicle's longitudinal speed, and δ 435 is the road wheel angle that is determined from the vehicle driver's steering angle input. A kinematic model for the trailer can be derived by the measurements $l_w$, $l_{tr}$, $l_h$ of the vehicle 402/trailer 404 over time t for calculations of the HAA 410 "ϕ".

Figure 5:
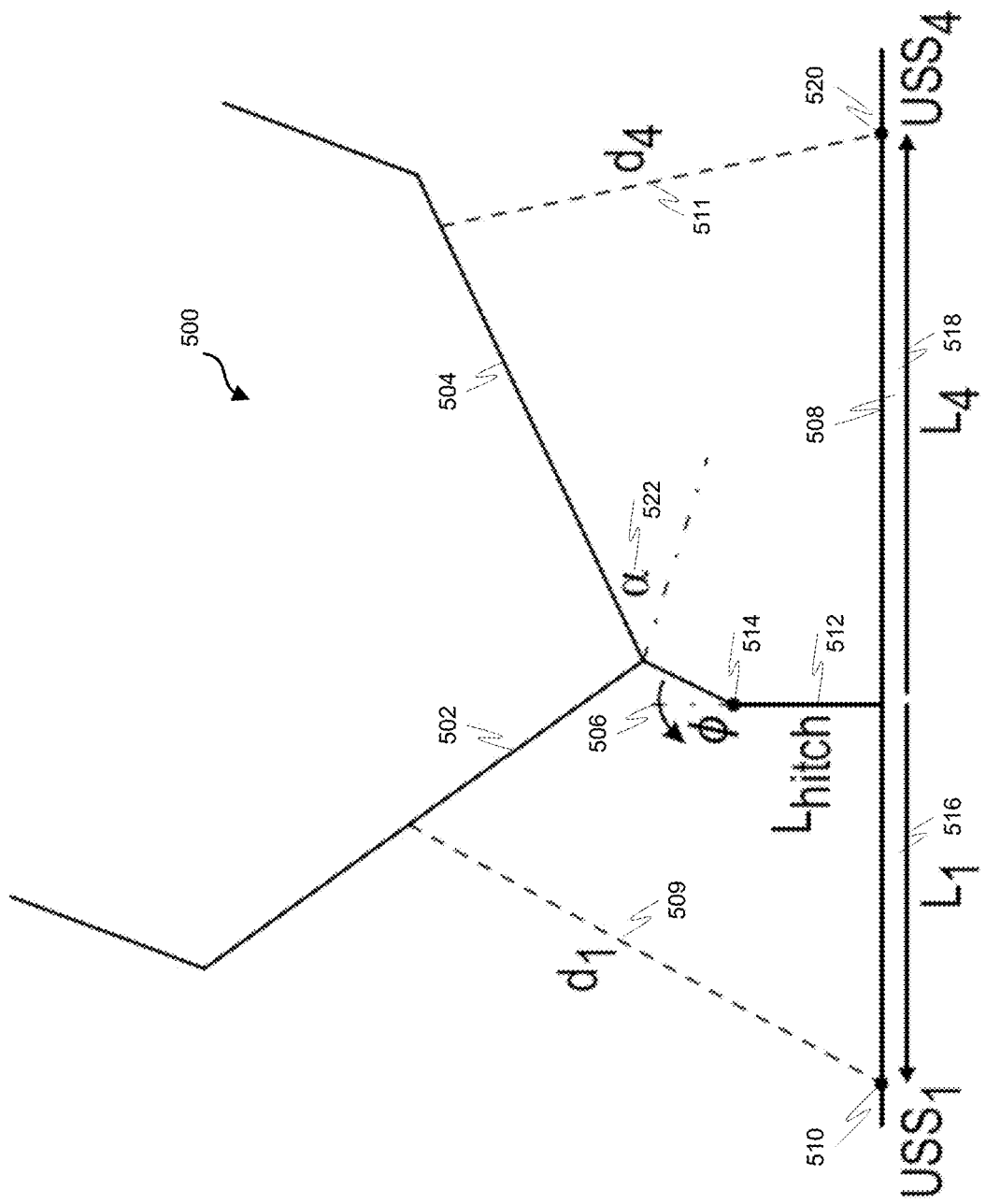
FIG. 5 is diagram depicting an example front section of a trailer, in accordance with an embodiment.

FIG. 5 is diagram depicting an example front section 500 of a trailer. The example front section 500 has a V-shape with a first front face 502 and a second front face 504. Depicted is an HAA 506 "ϕ" between a rear section 508 (e.g., bumper) of a vehicle and the front section 500 of the trailer that can be calculated according to geometric equations. In this example, HAA 506 "ϕ" is calculated based on the following geometric equation:

$$\left[d_1 - \frac{L_{hitch}}{\cos(\phi+\alpha)} - (L_1 - L_{hitch}\tan(\phi+\alpha))\sin(\phi+\alpha)\right] - $$
$$\left[d_4 - \frac{L_{hitch}}{\cos(-\phi+\alpha)} - (L_4 - L_{hitch}\tan(-\phi+\alpha))\sin(-\phi+\alpha)\right] = 0,$$

where $d_1$ (509) is a distance measured by sensor 1 ($USS_1$) 510, and $d_4$ (511) is a distance measured by sensor 4 ($USS_4$), $L_{hitch}$ 512 is the distance between a vehicle bumper 508 to a hitch point 514, $L_1$ (516) is the distance between the vehicle bumper's middle point to sensor 1 510 ($USS_1$), $L_4$ (518) is the distance between the vehicle bumper's middle point to sensor 4 ($USS_4$) 520, and a (522) is the face angle of the trailer front. This equation can be numerically solved in order to obtain a value for the unknown HAA, denoted by ϕ.

With reference to FIGS. 2, 3A, 3B, 4, and 5, the example USS curve generation module 202 is configured to receive a plurality of ultrasonic sensor (USS) range measurements 201 for a specific USS (e.g., $USS_1$ of FIG. 5) on a vehicle (e.g., vehicle 402 of FIG. 4) while the vehicle is towing a trailer (e.g., trailer 404 of FIG. 4) in a forward direction. The plurality of USS range measurements 201 can be stored in a data store 208. A USS range measurement (e.g., $d_1$ of FIG. 5) for a specific USS (e.g., $USS_1$) provides a measurement of a distance between the specific USS and a face 502 of the towed trailer at a specific instance. The example USS curve generation module 202 is also configured to receive a plurality of HAA values 203 (e.g., ϕ 410 of FIG. 4 or ϕ of FIG. 5) calculated using geometric equations or a kinematic model that correspond to the plurality of USS range measurements, wherein each HAA value corresponds to one of the plurality of USS range measurements and each USS range measurement has a corresponding HAA value. The example USS curve generation module 202 can perform curve generation using a selected, limited range of corresponding HAA-USS values. The plurality of HAA values 203 can also be stored in the data store 208.

The example USS curve generation module 202 is further configured to determine USS curve characteristics for the specific USS. The USS curve characteristics include a curve-fitting function 302 that is mapped to a likely valid cluster 304 of the plurality of USS range measurements for the specific USS and defines a mathematical relationship (e.g., mathematical relationship 306) between USS range measurements in the likely valid cluster 304 of USS range measurements and corresponding HAA values. The USS curve characteristics further include an upward-bounding function (e.g., upward-bounding curve 308) that is mapped to an upward boundary for USS range measurements in the likely valid cluster 304, and a lower-bounding function (e.g., lower-bounding curve 310) that is mapped to a lower boundary for USS range measurements in the likely valid cluster 304.

To determine USS curve characteristics for a specific USS, the USS curve generation module 202 is configured to pair USS range measurements for the specific USS with a corresponding HAA value (e.g., in data store 208) to form USS range measurement/HAA value (USS-HAA) pairs; perform clustering analysis on the USS-HAA pairs; identify the likely valid cluster (e.g., likely cluster 304) of the plurality of USS range measurements based on the clustering analysis; and determine the curve-fitting function 302, upward-bounding curve 308, and lower-bounding curve 310 from the likely valid cluster 304 of the plurality of USS range measurements.

The USS curve generation module 202 may be configured to receive a plurality of USS range measurements for each of a plurality of USSs on a vehicle while the vehicle is towing a trailer in a forward direction and determine USS curve characteristics for each of the plurality of USSs within a range of received USS range measurements, as illustrated in FIG. 3A, wherein the USS curve characteristics are expanded beyond the range within which the USS curve characteristics were initially constructed to provide an expected range of acceptable USS-HAA pairs that extends beyond the range of the received USS range measurements.

The example single sensor HAA calculation module 204 is configured to receive a USS range measurement 205 (e.g., $d_1$ or $d_4$ of FIG. 5) for the specific USS (e.g., $USS_1$ or $USS_4$ of FIG. 5) while the vehicle is operating in a reverse direction or experiencing a high HAA, but not from a second USS whose USS range measurements are used in a pair with the USS range measurements for the specific USS to calculate an HAA using geometric equations or a kinematic model. A high HAA can be an angle at which accurate USS returns are not available from both USSs in any pair of USSs on the vehicle that are used for calculating an HAA using geometric equations or a kinematic model, but an angle wherein accurate USS returns from one USS in a pair of USSs is available.

The example single sensor HAA calculation module 204 is further configured to estimate an HAA value 207 from the USS range measurement 205 from the specific USS by applying the USS curve characteristics (e.g., 302, 308, 310) for the specific USS. To estimate an HAA value from the USS range measurement from the specific USS by applying the USS curve characteristics for the specific USS, the single sensor HAA calculation module 204 may filter out USS range measurements for the specific USS using the upward-bounding function (e.g., upward-bounding curve 308) and lower-bounding function (e.g., lower-bounding curve 310) and/or match the USS range measurement from the specific USS with an estimated HAA based on applying the mathematical relationship between USS range measurements in the valid cluster of USS range measurements and corresponding HAA values defined by the curve-fitting function 302.

The single sensor HAA calculation module 204 may be configured to receive a USS range measurement for any one of a plurality of USSs on a vehicle while the vehicle is operating in a reverse direction or experiencing a high HAA but not from a second USS whose USS range measurements are used in a pair with the USS range measurements for the one of the plurality of USSs to calculate an HAA using geometric equations or a kinematic model, and estimate an HAA value from the USS range measurement from the one of the plurality of USSs by applying the USS curve characteristics for the one of the plurality of USSs.

The example larger angle HAA calculation module 206 is configured, when a vehicle is experiencing a high HAA, to estimate an HAA value using appropriate USS curve characteristics, determine whether an HAA value calculated using geometric equations or a kinematic model is available, select the HAA value calculated using geometric equations or a kinematic model when available to pass as the calculated HAA 209 to vehicle motion controls, and select the estimated HAA value to pass as the calculated HAA 209 to vehicle motion controls when an HAA value calculated using geometric equations or a kinematic model is not available. As illustrated in graph 360 of FIG. 3B, at high HAA times (e.g., 362, 364, 366, 368) when a vehicle is experiencing a high HAA, determination of an HAA value using geometric equations or a kinematic model may not be available, but (as illustrated in graph 370) curve-calculated estimate HAA values from module 204 may be merged with the HAA values calculated using geometric equations or a kinematic model to provide estimated HAA values during the high HAA times (e.g., 362, 364, 366, 368).

Figure 6:
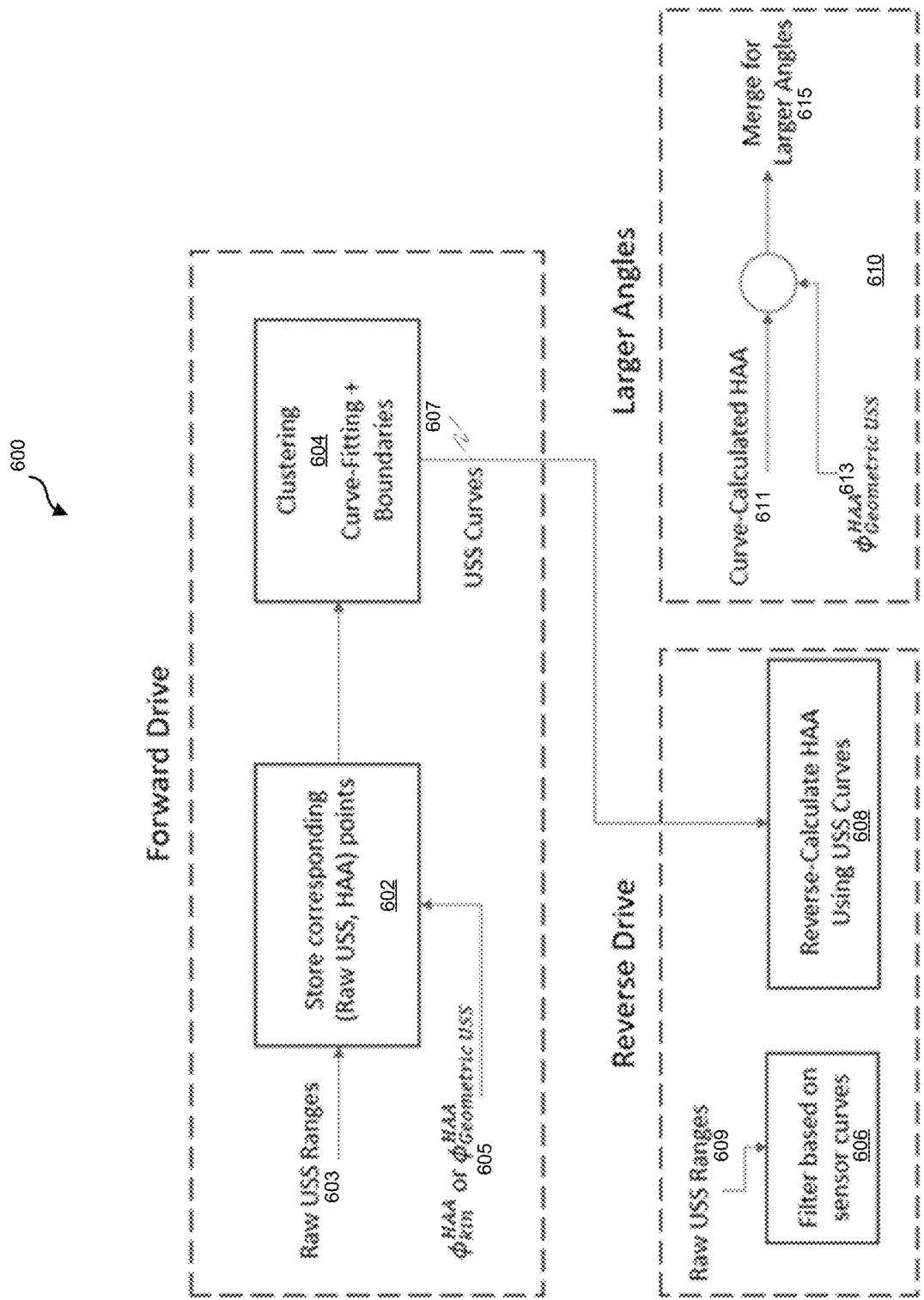
FIG. 6 is a process flow chart depicting an example process for estimating an HAA between a vehicle and a towed trailer, in accordance with an embodiment.

FIG. 6 is a process flow chart depicting an example process 600 for estimating an HAA between a vehicle and a towed trailer. The order of operation within process 600 is not limited to the sequential execution as illustrated in the FIG. 6 but may be performed in one or more varying orders as applicable and in accordance with the present disclosure.

The example process 600 includes, while the vehicle and trailer are driven in a forward direction, storing corresponding raw USS ranges 603/HAA values 605 (operation 602). The HAA values 605 may be calculated using geometric equations or a kinematic model.

The example process 600 includes performing clustering to identify a likely valid cluster of USS ranges 603/HAA values 605, curve-fitting for the likely valid cluster, and defining boundaries for the likely valid cluster (operation 604). These operations are performed to define USS curve characteristics 607 for a USS.

The example process 600 includes, while the vehicle and trailer are driven in a reverse direction, filtering out received raw USS ranges 609 based on the USS curve characteristics 607 (operation 606). The example process 600 further includes, while the vehicle and trailer are driven in a reverse direction, estimating an HAA using the USS curve characteristics 607 (operation 608).

The example process 600 includes, while the vehicle and trailer are experiencing larger hitch articulation angles, merging curve-calculated HAA values with HAA values calculated using geometric equations or a kinematic model (operation 610). This can involve obtaining a curve-calculated HAA value 611, obtaining HAA values 613 calculated using geometric equations or a kinematic model, selecting the HAA value calculated using geometric equations or a kinematic model for use when available, and selecting the estimated HAA value for use when an HAA value calculated using geometric equations or a kinematic model is not available. This results in a merged series of HAA 615, especially for larger HAAs when the use of geometric equations or a kinematic model may not be available.

Figure 7:
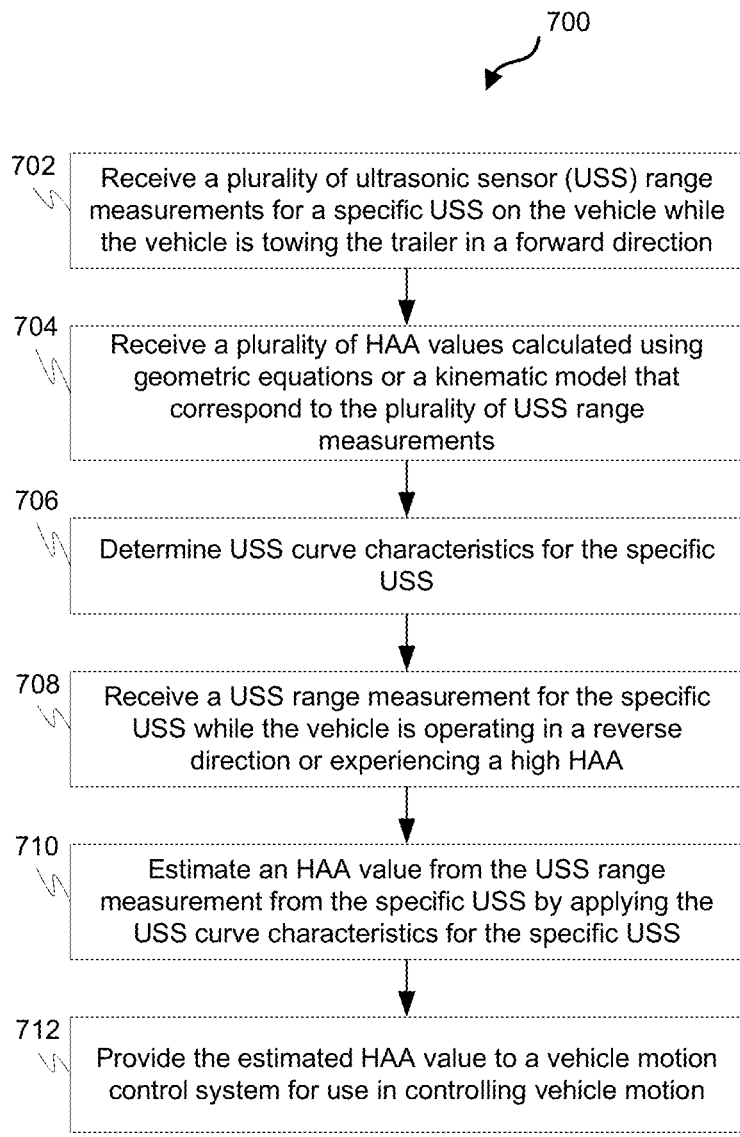
FIG. 7 is a process flow chart depicting another example process for estimating an HAA between a vehicle and a towed trailer, in accordance with an embodiment.

FIG. 7 is a process flow chart depicting an example process 700 for estimating an HAA between a vehicle and a towed trailer. The order of operation within process 700 is not limited to the sequential execution as illustrated in the FIG. 7 but may be performed in one or more varying orders as applicable and in accordance with the present disclosure.

The example process 700 includes receiving a plurality of ultrasonic sensor (USS) range measurements for a specific USS on the vehicle while the vehicle is towing the trailer in a forward direction (operation 702). A USS range measurement for a specific USS provides a measurement of a distance between the specific USS and a face of the towed trailer at a specific instance.

The example process 700 includes receiving a plurality of HAA values calculated using geometric equations or a kinematic model that correspond to the plurality of USS range measurements (operation 704). Each HAA value corresponds to one of the plurality of USS range measurements and each USS range measurement has a corresponding HAA value.

The example process 700 includes determining USS curve characteristics for the specific USS (operation 706). The USS curve characteristics include: a curve-fitting function that is mapped to a likely valid cluster of the plurality of USS range measurements for the specific USS and defines a mathematical relationship between USS range measurements in the valid cluster of USS range measurements and corresponding HAA values; an upward-bounding function that is mapped to an upward boundary for USS range measurements in the valid cluster; and a lower-bounding function that is mapped to a lower boundary for USS range measurements in the valid cluster.

Determining USS curve characteristics for a specific USS may include: pairing USS range measurements for the specific USS with a corresponding HAA value to form USS range measurement/HAA value (USS-HAA) pairs; performing clustering analysis on the USS-HAA pairs; identifying the likely valid cluster of the plurality of USS range measurements based on the clustering analysis; and determining the curve-fitting function, upward-bounding function, and lower-bounding function from the likely valid cluster of the plurality of USS range measurements.

The example process 700 includes receiving a USS range measurement for the specific USS while the vehicle is operating in a reverse direction or experiencing a high HAA (operation 708). but not from a second USS whose USS range measurements are used in a pair with the USS range measurements for the specific USS to calculate an HAA using geometric equations or a kinematic model.

The example process 700 includes estimating an HAA value from the USS range measurement from the specific USS by applying the USS curve characteristics for the specific USS (operation 710). Estimating an HAA value from the USS range measurement from the specific USS by applying the USS curve characteristics for the specific USS may include: filtering out USS range measurements for the specific USS using the upward-bounding function and/or lower-bounding function; and matching the USS range measurement from the specific USS with an estimated HAA based on applying the mathematical relationship between USS range measurements in the valid cluster of USS range measurements and corresponding HAA values defined by the curve-fitting function.

The example process 700 includes providing the estimated HAA value to a vehicle motion control system for use in controlling vehicle and trailer motion (operation 712). The example process 700 may further include receiving a plurality of USS range measurements for each of a plurality of USSs on the vehicle while the vehicle is towing the trailer in a forward direction and determining USS curve characteristics for each of the plurality of USSs within a range of received USS range measurements, wherein the USS curve characteristics are expanded beyond the range within which the USS curve characteristics were initially constructed to provide an expected range of acceptable USS-HAA pairs that extends beyond the range of the received USS range measurements. The example process 700 may further include receiving a USS range measurement for any one of the plurality of USSs while the vehicle is operating in a reverse direction or experiencing a high HAA but not from a second USS whose USS range measurements are used in a pair with the USS range measurements for the one of the plurality of USSs to calculate an HAA using geometric equations or a kinematic model.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A Hitch Articulation Angle (HAA) calculation system in a vehicle for estimating an HAA between the vehicle and a towed trailer, the HAA calculation system comprising a controller, the controller configured to:
   receive a plurality of ultrasonic sensor (USS) range measurements for a first USS on the vehicle while the vehicle is towing the trailer in a forward direction, wherein a USS range measurement for a specific USS provides a measurement of a distance between the specific USS and a face of the towed trailer at a specific instance;
   receive a plurality of HAA values calculated using geometric equations or a kinematic model that correspond to the plurality of USS range measurements, wherein each HAA value corresponds to one of the plurality of USS range measurements and each USS range measurement has a corresponding HAA value;
   determine USS curve characteristics for the first USS, wherein the USS curve characteristics include:
      a curve-fitting function that is mapped to a likely valid cluster of the plurality of USS range measurements for the first USS and defines a mathematical relationship between USS range measurements in the valid cluster of USS range measurements and corresponding HAA values;
      an upward-bounding function that is mapped to an upward boundary for USS range measurements in the valid cluster; and
      a lower-bounding function that is mapped to a lower boundary for USS range measurements in the valid cluster;
   receive a USS range measurement for the first USS while the vehicle is operating in a reverse direction or experiencing a high HAA but not from a second USS whose USS range measurements are used in a pair with the USS range measurements for the first USS to calculate an HAA using geometric equations or a kinematic model;
   estimate an HAA value from the USS range measurement from the first USS by applying the USS curve characteristics for the first USS; and
   provide the estimated HAA value to a vehicle motion control system for use in controlling vehicle and trailer motion.

2. The HAA calculation system of claim 1, wherein to determine USS curve characteristics for a first USS, the controller is configured to:
   pair USS range measurements for the first USS with a corresponding HAA value to form USS range measurement/HAA value (USS-HAA) pairs;
   perform clustering analysis on the USS-HAA pairs;
   identify the likely valid cluster of the plurality of USS range measurements based on the clustering analysis; and
   determine the curve-fitting function, upward-bounding function, and lower-bounding function from the likely valid cluster of the plurality of USS range measurements.

3. The HAA calculation system of claim 1, wherein to estimate an HAA value from the USS range measurement from the first USS by applying the USS curve characteristics for the first USS, the controller is configured to filter out USS range measurements for the first USS using the upward-bounding function and lower-bounding function.

4. The HAA calculation system of claim 3, wherein to estimate an HAA value from the USS range measurement from the first USS by applying the USS curve characteristics for the first USS, the controller is further configured to match the USS range measurement from the first USS with an estimated HAA based on applying the mathematical relationship between USS range measurements in the valid cluster of USS range measurements and corresponding HAA values defined by the curve-fitting function.

5. The HAA calculation system of claim 1, wherein the controller is configured to:
   receive a plurality of USS range measurements for each of a plurality of USSs on the vehicle while the vehicle is towing the trailer in a forward direction; and
   determine USS curve characteristics for each of the plurality of USSs within a range of received USS range measurements, wherein the USS curve characteristics are expanded beyond the range within which the USS curve characteristics were initially constructed to provide an expected range of acceptable USS-HAA pairs that extends beyond the range of the received USS range measurements.

6. The HAA calculation system of claim 5, wherein the controller is configured to:
receive a USS range measurement for any one of the plurality of USSs while the vehicle is operating in a reverse direction or experiencing a high HAA but not from a second USS whose USS range measurements are used in a pair with the USS range measurements for the one of the plurality of USSs to calculate an HAA using geometric equations or a kinematic model; and
estimate an HAA value from the USS range measurement from the one of the plurality of USSs by applying the USS curve characteristics for the one of the plurality of USSs.

7. The HAA calculation system of claim 1, wherein when the vehicle is experiencing a high HAA, the controller is configured to:
estimate an HAA value using appropriate USS curve characteristics;
determine whether an HAA value calculated using geometric equations or a kinematic model is available;
select the HAA value calculated using geometric equations or a kinematic model when available to pass to vehicle motion controls; and
select the estimated HAA value to pass to vehicle motion controls when an HAA value calculated using geometric equations or a kinematic model is not available.

8. A vehicle having a Hitch Articulation Angle (HAA) calculation system for estimating an HAA between the vehicle and a towed trailer, the vehicle comprising:
a plurality of ultrasonic sensors (USSs) mounted on the vehicle to sense a distance between a sensor and a face of the towed trailer;
a vehicle motion control system for controlling vehicle and trailer motion; and
a controller configured to:
receive a plurality of ultrasonic sensor (USS) range measurements for a first USS of the plurality of USSs while the vehicle is towing the trailer in a forward direction, wherein a USS range measurement for a specific USS provides a measurement of a distance between the specific USS and a face of the towed trailer at a specific instance;
receive a plurality of HAA values calculated using geometric equations or a kinematic model that correspond to the plurality of USS range measurements, wherein each HAA value corresponds to one of the plurality of USS range measurements and each USS range measurement has a corresponding HAA value;
determine USS curve characteristics for the first USS, wherein the USS curve characteristics include:
a curve-fitting function that is mapped to a likely valid cluster of the plurality of USS range measurements for the first USS and defines a mathematical relationship between USS range measurements in the valid cluster of USS range measurements and corresponding HAA values;
an upward-bounding function that is mapped to an upward boundary for USS range measurements in the valid cluster; and
a lower-bounding function that is mapped to a lower boundary for USS range measurements in the valid cluster;
receive a USS range measurement for the first USS while the vehicle is operating in a reverse direction or experiencing a high HAA but not from a second USS whose USS range measurements are used in a pair with the USS range measurements for the first USS to calculate an HAA using geometric equations or a kinematic model;
estimate an HAA value from the USS range measurement from the first USS by applying the USS curve characteristics for the first USS; and
provide the estimated HAA value to the vehicle motion control system for use in controlling vehicle and trailer motion.

9. The vehicle of claim 8, wherein to determine USS curve characteristics for a first USS, the controller is configured to:
pair USS range measurements for the first USS with a corresponding HAA value to form USS range measurement/HAA value (USS-HAA) pairs;
perform clustering analysis on the USS-HAA pairs;
identify the likely valid cluster of the plurality of USS range measurements based on the clustering analysis; and
determine the curve-fitting function, upward-bounding function, and lower-bounding function from the likely valid cluster of the plurality of USS range measurements.

10. The vehicle of claim 8, wherein to estimate an HAA value from the USS range measurement from the first USS by applying the USS curve characteristics for the first USS, the controller is configured to filter out USS range measurements for the first USS using the upward-bounding function and lower-bounding function.

11. The vehicle of claim 10, wherein to estimate an HAA value from the USS range measurement from the first USS by applying the USS curve characteristics for the first USS, the controller is further configured to match the USS range measurement from the first USS with an estimated HAA based on applying the mathematical relationship between USS range measurements in the valid cluster of USS range measurements and corresponding HAA values defined by the curve-fitting function.

12. The vehicle of claim 8, wherein the controller is configured to:
receive a plurality of USS range measurements for each of a plurality of USSs on the vehicle while the vehicle is towing the trailer in a forward direction; and
determine USS curve characteristics for each of the plurality of USSs within a range of received USS range measurements, wherein the USS curve characteristics are expanded beyond the range within which the USS curve characteristics were initially constructed to provide an expected range of acceptable USS-HAA pairs that extends beyond the range of the received USS range measurements.

13. The vehicle of claim 12, wherein the controller is configured to:
receive a USS range measurement for any one of the plurality of USSs while the vehicle is operating in a reverse direction or experiencing a high HAA but not from a second USS whose USS range measurements are used in a pair with the USS range measurements for the one of the plurality of USSs to calculate an HAA using geometric equations or a kinematic model; and estimate an HAA value from the USS range measurement from the one of the plurality of USSs by applying the USS curve characteristics for the one of the plurality of USSs.

14. The vehicle of claim 8, wherein when the vehicle is experiencing a high HAA, the controller is configured to:
   estimate an HAA value using appropriate USS curve characteristics;
   determine whether an HAA value calculated using geometric equations or a kinematic model is available;
   select the HAA value calculated using geometric equations or a kinematic model when available to pass to vehicle motion controls; and
   select the estimated HAA value to pass to vehicle motion controls when an HAA value calculated using geometric equations or a kinematic model is not available.

15. A method in a vehicle having a Hitch Articulation Angle (HAA) calculation system for estimating an HAA between the vehicle and a towed trailer, the method comprising:
   receiving a plurality of ultrasonic sensor (USS) range measurements for a first USS on the vehicle while the vehicle is towing the trailer in a forward direction, wherein a USS range measurement for a specific USS provides a measurement of a distance between the specific USS and a face of the towed trailer at a specific instance;
   receiving a plurality of HAA values calculated using geometric equations or a kinematic model that correspond to the plurality of USS range measurements, wherein each HAA value corresponds to one of the plurality of USS range measurements and each USS range measurement has a corresponding HAA value;
   determining USS curve characteristics for the first USS, wherein the USS curve characteristics include:
      a curve-fitting function that is mapped to a likely valid cluster of the plurality of USS range measurements for the first USS and defines a mathematical relationship between USS range measurements in the valid cluster of USS range measurements and corresponding HAA values;
      an upward-bounding function that is mapped to an upward boundary for USS range measurements in the valid cluster; and
      a lower-bounding function that is mapped to a lower boundary for USS range measurements in the valid cluster;
   receiving a USS range measurement for the first USS while the vehicle is operating in a reverse direction or experiencing a high HAA but not from a second USS whose USS range measurements are used in a pair with the USS range measurements for the first USS to calculate an HAA using geometric equations or a kinematic model;
   estimating an HAA value from the USS range measurement from the first USS by applying the USS curve characteristics for the first USS; and
   providing the estimated HAA value to a vehicle motion control system for use in controlling vehicle and trailer motion.

16. The method of claim 15, wherein determining USS curve characteristics for a first USS comprises:
   pairing USS range measurements for the first USS with a corresponding HAA value to form USS range measurement/HAA value (USS-HAA) pairs;
   performing clustering analysis on the USS-HAA pairs;
   identifying the likely valid cluster of the plurality of USS range measurements based on the clustering analysis; and
   determining the curve-fitting function, upward-bounding function, and lower-bounding function from the likely valid cluster of the plurality of USS range measurements.

17. The method of claim 15, wherein estimating an HAA value from the USS range measurement from the first USS by applying the USS curve characteristics for the first USS, comprises:
   filtering out USS range measurements for the first USS using the upward-bounding function and lower-bounding function; and
   matching the USS range measurement from the first USS with an estimated HAA based on applying the mathematical relationship between USS range measurements in the valid cluster of USS range measurements and corresponding HAA values defined by the curve-fitting function.

18. The method of claim 15, further comprising:
   receiving a plurality of USS range measurements for each of a plurality of USSs on the vehicle while the vehicle is towing the trailer in a forward direction; and
   determining USS curve characteristics for each of the plurality of USSs within a range of received USS range measurements, wherein the USS curve characteristics are expanded beyond the range within which the USS curve characteristics were initially constructed to provide an expected range of acceptable USS-HAA pairs that extends beyond the range of the received USS range measurements.

19. The method of claim 18, further comprising receiving a USS range measurement for any one of the plurality of USSs while the vehicle is operating in a reverse direction or experiencing a high HAA but not from a second USS whose USS range measurements are used in a pair with the USS range measurements for the one of the plurality of USSs to calculate an HAA using geometric equations or a kinematic model.

20. The method of claim 15, wherein when the vehicle is experiencing a high HAA, the method further comprises:
   estimating an HAA value using appropriate USS curve characteristics;
   determining whether an HAA value calculated using geometric equations or a kinematic model is available;
   selecting the HAA value calculated using geometric equations or a kinematic model when available to pass to vehicle motion controls; and
   selecting the estimated HAA value to pass to vehicle motion controls when an HAA value calculated using geometric equations or a kinematic model is not available.

* * * * *